US012589708B2

(12) United States Patent
Park et al.

(10) Patent No.: US 12,589,708 B2
(45) Date of Patent: Mar. 31, 2026

(54) FRONT END MODULE FRAME OF VEHICLE

(71) Applicants: Hyundai Motor Company, Seoul (KR); Kia Corporation, Seoul (KR); HYUNDAI MOBIS CO., LTD., Seoul (KR)

(72) Inventors: Tae Ou Park, Seongnam-Si (KR); Won Gun Kim, Seoul (KR); Do Hoi Kim, Sejong-Si (KR); Jae Sup Byun, Seongnam-Si (KR); Jang Ho Kim, Seoul (KR)

(73) Assignees: Hyundai Motor Company, Seoul (KR); Kia Corporation, Seoul (KR); Hyundai Mobis Co., Ltd., Seoul (KR)

( * ) Notice: Subject to any disclaimer, the term of this patent is extended or adjusted under 35 U.S.C. 154(b) by 442 days.

(21) Appl. No.: 18/373,188

(22) Filed: Sep. 26, 2023

(65) Prior Publication Data

US 2024/0308455 A1     Sep. 19, 2024

(30) Foreign Application Priority Data

Mar. 16, 2023     (KR) ........................ 10-2023-0034743

(51) Int. Cl.
B60R 19/34          (2006.01)
B60R 19/02          (2006.01)
(52) U.S. Cl.
CPC ............ B60R 19/34 (2013.01); B60R 19/023 (2013.01)

(58) Field of Classification Search
None
See application file for complete search history.

(56) References Cited

U.S. PATENT DOCUMENTS

| | | | | |
|---|---|---|---|---|
| 7,640,966 B2 | 1/2010 | Maeda et al. | | |
| 8,287,036 B2 * | 10/2012 | Nakaura | ................ | B60K 11/08 |
| | | | | 296/203.02 |
| 9,212,598 B2 | 12/2015 | Platt et al. | | |
| 10,479,302 B2 * | 11/2019 | Kawamura | ........... | B62D 25/08 |

FOREIGN PATENT DOCUMENTS

| | | |
|---|---|---|
| KR | 10-2011-0043923 | 4/2011 |
| KR | 10-1756163 | 7/2017 |

* cited by examiner

*Primary Examiner* — Nicholas McFall
(74) *Attorney, Agent, or Firm* — MORGAN, LEWIS & BOCKIUS LLP

(57)          ABSTRACT

A front end module frame includes a lower member which is provided at opposite end portions thereof with lower crash boxes connected to the front end portion of a front sub-frame of the vehicle, and a front bumper beam which extends in a width direction of the vehicle and is provided with front crash boxes connected to the front end portion of a front side member of the vehicle, the lower crash boxes of the lower member and the front crash boxes of the front bumper beam being connected to a cooling module in forward and backward directions of the vehicle in the state in which the cooling module is diagonally tilted with respect to a longitudinal direction of the vehicle.

19 Claims, 5 Drawing Sheets

FRONT END MODULE FRAME OF VEHICLE

CROSS-REFERENCE TO RELATED APPLICATION

The present application claims priority to Korean Patent Application No. 10-2023-0034743, filed on Mar. 16, 2023, the entire contents of which is incorporated herein for all purposes by this reference.

BACKGROUND OF THE PRESENT DISCLOSURE

Field of the Present Disclosure

The present disclosure relates to a front end module frame of a vehicle, and more particularly, to a front end module frame of a vehicle, which is configured for robustly supporting a cooling module in the tilted state.

Description of Related Art

In recent years, microcompact vehicles each having a personal mobility concept are widely used with propagation of electric vehicles, social empathy for environmental problems and increase in single-person households. However, because a microcompact vehicle is designed to have a very short front overhang, the current situation is that the space required to absorb impact in the event of collision is greatly insufficient.

When an impact-absorbing space in a front structure of a vehicle is insufficient, all of the impact attributable to collision is transferred to passengers, thereby increasing the injury rate of the passengers.

A cooling system of a vehicle is designed to prevent overheating of an engine and batteries provided in the vehicle and to maintain the temperature required for normal operation, achieving optimal performance. A cooling module, which is one of components forming a cooling system of a vehicle, may be composed of a radiator and a cooling fan.

The radiator is capable of bringing heat, generated by an engine or a battery, into contact with air outside a vehicle and thus of discharging the heat to the atmosphere, and the cooling fan is capable of further rapidly discharging the heat of the radiator through forced convection.

Generally, a cooling module is disposed in a vertical direction of the vehicle, is preliminarily assembled with a front end module carrier (an FEM carrier), and is mounted to a vehicle as an assembly. Here, when the cooling module is tilted to improve cooling effect, the angle at which the cooling module is tilted is proportional to the difficulty to robustly mount the cooling module to a frame of the vehicle.

Accordingly, there is demand for a solution for securing a cooling module to a frame of a vehicle in the state in which the cooling module is tilted at a specific angle in a range from 0 degrees to 90 degrees.

The information included in the present Background of the present disclosure is only for enhancement of understanding of the general background of the present disclosure and may not be taken as an acknowledgement or any form of suggestion that the present information forms the prior art already known to a person skilled in the art.

BRIEF SUMMARY

Various aspects of the present disclosure are directed to providing a front end module frame of a vehicle, which is constructed to robustly support the cooling module in the tilted state, increasing the frunk space, and which is constructed so that the surface area in which air comes into contact with the cooling module during traveling of the vehicle is increased and thus flowability of air is improved, improving effects of cooling an engine and a battery.

In accordance with the present disclosure, the above and other objects may be accomplished by the provision of a front end module frame of a vehicle including a front bumper beam which extends in a width direction of the vehicle and is connected to a lower member in a vertical direction of the vehicle, the front bumper beam including front crash boxes provided at opposite end portions of the front bumper beam, and the front crash boxes being connected to a front end portion of a front side member, wherein the front crash boxes provided at the opposite end portions of the front bumper beam are respectively connected to a cooling module via opposite lateral sides of the cooling module in forward and backward directions of the vehicle in a state in which the cooling module is diagonally tilted with respect to a longitudinal direction of the vehicle.

In an exemplary embodiment of the present disclosure, the lower member may be disposed on a front and lower portion of the vehicle to extend in a width direction of the vehicle and may be provided at opposite end portions thereof with lower crash boxes, the lower crash boxes being connected to a front end portion of a front sub-frame, and the lower crash boxes provided at the opposite end portions of the lower member being respectively connected to the opposite lateral sides of the cooling module in a state in which the cooling module is diagonally tilted with respect to a longitudinal direction of the vehicle.

In an exemplary embodiment of the present disclosure, the cooling module may be provided at lateral sides of a lower end portion thereof with lower mounting brackets and may be provided at lateral sides of an upper end portion thereof with upper mounting brackets.

In an exemplary embodiment of the present disclosure, the lower mounting brackets may be formed to project outwards from the lateral sides of the lower end portion of the cooling module, and the upper mounting brackets may be formed to project upwards from the lateral sides of the upper end portion of the cooling module.

In an exemplary embodiment of the present disclosure, each of the crash boxes may be provided at a lateral side thereof with a first bracket which extends in a rearward direction of the vehicle, the first bracket being connected to a corresponding one of the lower mounting brackets in a state in which the cooling module is diagonally tilted with respect to a longitudinal direction of the vehicle.

In an exemplary embodiment of the present disclosure, the first bracket may be fastened to the lower mounting bracket in the vertical direction of the vehicle.

In an exemplary embodiment of the present disclosure, each of the front crash boxes may be provided at a lateral side thereof with a second bracket which extends in an inward direction of the vehicle, the second bracket being connected to a corresponding one of the upper mounting brackets in a state in which the cooling module is diagonally tilted with respect to a longitudinal direction of the vehicle.

In an exemplary embodiment of the present disclosure, the second bracket may be fastened both to a lateral side of a corresponding one of the front crash boxes and a front end portion of the front side member using bolts.

In an exemplary embodiment of the present disclosure, the second bracket may be connected to a corresponding one of the upper mounting brackets in a width direction of the vehicle.

In an exemplary embodiment of the present disclosure, the upper mounting brackets may be disposed behind the lower mounting brackets in a rearward direction of the vehicle in a state in which the cooling module is diagonally tilted with respect to a longitudinal direction of the vehicle.

In an exemplary embodiment of the present disclosure, the cooling module may be provided at lateral sides thereof with insulators configured to block transmission of vibration to the frame when external impact is applied to the vehicle, the insulators being respectively disposed at points at which the lower crash boxes and the front crash boxes are connected to the lateral sides of the cooling module.

In an exemplary embodiment of the present disclosure, the lower crash boxes may be connected to a front end portion of the front sub-frame, and front end portions of the lower crash boxes may be connected to the lower member.

In an exemplary embodiment of the present disclosure, each of the lower crash boxes may include a lower impact-absorbing portion including a form of a column and a lower flange portion formed at a rear end portion of the lower impact-absorbing portion, the lower flange portion being connected to the front end portion of the front sub-frame.

In an exemplary embodiment of the present disclosure, the front bumper beam may be connected at a point which faces the front end portion of the front side member so that the front bumper beam and the front side member together form a front load pass.

In an exemplary embodiment of the present disclosure, the front end module frame may further include an upper member which is disposed on a front and upper portion of the vehicle to extend in the width direction of the vehicle and is connected to the front bumper beam in a height direction of the vehicle, the upper member being bent at opposite end portions thereof toward the vehicle and being connected to a fender apron member of the vehicle.

In an exemplary embodiment of the present disclosure, the fender apron member may be provided at a front end portion thereof with an upper crash box, and the upper member may be connected to a front end portion of the upper crash box.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
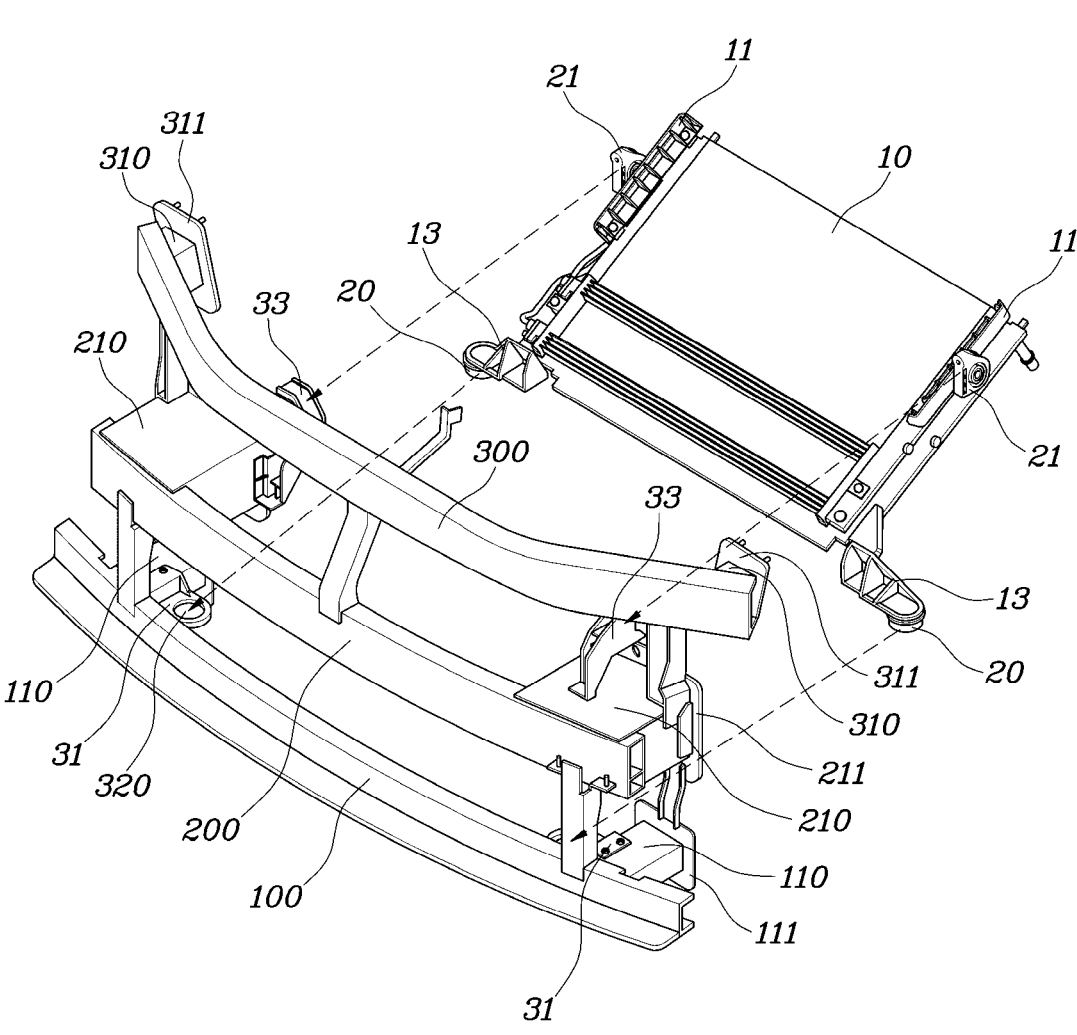
FIG. 1 is a view exemplarily illustrating a front end module frame of a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments, it will be understood that the present description is not intended to limit the present disclosure(s) to those exemplary embodiments of the present disclosure. On the other hand, the present disclosure (s) is/are intended to cover not only the exemplary embodiments, but also various alternatives, modifications, equivalents and other embodiments, which may be included within the spirit and scope of the present disclosure as defined by the appended claims.

Reference will now be made in detail to the exemplary embodiments of the present disclosure, examples of which are illustrated in the accompanying drawings. Wherever possible, the same reference numbers will be used throughout the drawings to refer to the same or like parts.

A description will now be given in detail according to exemplary embodiments included herein, with reference to the accompanying drawings. For the sake of brevity of description with reference to the drawings, the same or equivalent components may be denoted by the same reference numbers, and a description thereof will not be repeated.

In general, suffixes such as "module" and "unit", when used in the following description, may be used to refer to elements or components for easy preparation of the specification. The use of such suffixes herein is merely intended to facilitate the description of the specification, and the suffixes do not imply any special meaning or function.

Furthermore, in the following description of embodiments included herein, when it is decided that a detailed description of known functions or configurations related to the present disclosure would make the subject matter of the present disclosure unclear, such detailed description is omitted. The accompanying drawings are used to assist in easy understanding of various technical features, and it should be understood that the exemplary embodiments presented herein are not limited by the accompanying drawings. Accordingly, the present disclosure should be construed to extend to any alterations, equivalents, and substitutes, in addition to those which are particularly set out in the accompanying drawings. It will be understood that although the terms "first", "second", etc. may be used herein to describe various elements, these elements should not be construed as being limited by these terms. These terms are only used to distinguish one element from another.

It should be understood that, when an element is referred to as being "connected to" another element, there may be intervening elements present, or the element may be directly connected to the another element. In contrast, it should be understood that, when an element is referred to as being "directly connected to" another element, there are no intervening elements present.

A singular representation may include a plural representation unless the context clearly indicates otherwise.

Terms such as "includes" or "has" used herein should be considered as indicating the presence of various features, numbers, steps, operations, elements, components or combinations thereof included in the specification, but it should be understood that the presence or addition of one or more other features, numbers, steps, operations, elements, components or combinations thereof is not excluded.

According to various exemplary embodiments of the present disclosure, it is suggested to robustly support a cooling module in the tilted state in a structure in which the cooling module is disposed on a front end module frame of a vehicle.

FIG. 1 is a view exemplarily illustrating a front end module frame of a vehicle according to various exemplary embodiments of the present disclosure. Furthermore, FIG. 2 is a view exemplarily illustrating the front end module frame of a vehicle according to various exemplary embodiments of the present disclosure, which is viewed from a lateral side thereof.

Figure 2:
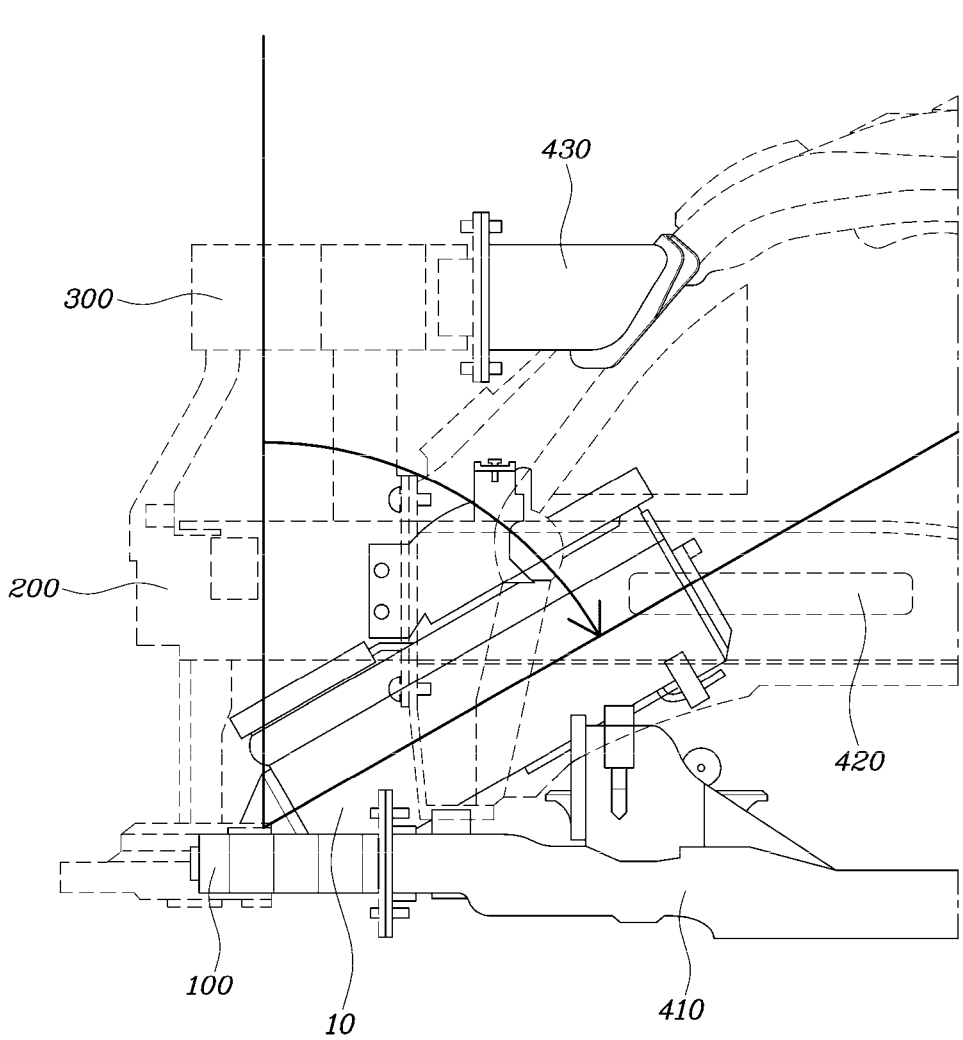
FIG. 2 is a view exemplarily illustrating the front end module frame of a vehicle according to various exemplary embodiments of the present disclosure, which is viewed from a lateral side.

Referring to FIG. 1 and FIG. 2, the front end module frame of a vehicle according to various exemplary embodiments of the present disclosure may include a lower member 100 and a front bumper beam 200.

The lower member 100 may be disposed on a front and lower portion of the vehicle to extend in a width direction of the vehicle. Based on the longitudinal direction of the vehicle, the lower member 100 may be disposed on the front portion of the vehicle in front of the front bumper beam 200, which will be described later, to transfer impact energy to the lower member 100 in the event of collision. As also shown in FIG. 2, a lower crash box 110 and 111 may be connected to the front end portion of a front sub-frame 410 of the vehicle. The lower member 100 may be connected at a point which faces the front end portion of the front sub-frame 410 so that the lower member 100 and the front sub-frame 410 together form a front load pass. The lower crash box 110 and 111 may be formed at each of opposite end portions of the lower member 100 to transfer impact energy to the front sub-frame 410 in the event of collision at a front side of the vehicle. As a result, it is possible to remarkably reduce the impact energy transferred to the center portion of the vehicle in the event of the collision at the front side of the vehicle.

The lower crash box 100, 111 may include a lower impact-absorbing portion 110 including the form of a column and a lower flange portion 111 formed at the rear end portion of the lower impact-absorbing portion 110. The lower flange portion 111 may be enlarged in the width direction of the vehicle to be easily connected to the front end portion of the front sub-frame 410 using bolts.

The front bumper beam 200 may extend in the width direction of the vehicle, and may be connected to the lower member 100 in the height direction of the vehicle. The front bumper beam 200 may be connected to the lower member 100 so that impact energy is transferred upwards in the event of collision at the front side of the vehicle.

Similar to the above-mentioned lower crash box 110 and 111, a front crash box 210, 211 may be connected to the front end portion of a front side member 420 of the vehicle, as shown in FIG. 2. The front bumper beam 200 may be connected at a point which faces the front end portion of the front side member 420 so that the front bumper beam 200 and the front side member 420 together form the front load pass. The front crash box 210, 211 may be formed at each of opposite end portions of the front bumper beam 200 to transfer impact energy to the front side member 420 in the event of collision at the front side of the vehicle. As a result, it is possible to remarkably reduce impact energy transferred to the center portion of the vehicle in the event of collision at the front side of the vehicle, similar to the lower crash box 110, 111.

The front crash box 210, 211 may include a front impact-absorbing portion 210 including the form of a column and a front flange portion 211 formed at the rear end portion of the front impact-absorbing portion 210. The front flange portion 211 may be enlarged in the width direction of the vehicle to be easily connected to the front end portion of the front side member 420 using bolts.

The lower crash box 110, 111 of the lower member 100 and the front crash box 210, 211 of the front bumper beam 200 may be connected to lateral side portions of a cooling module 10 in the state of being diagonally tilted to be connected to the cooling module 10 in forward and backward directions of the vehicle.

Hereinafter, a structure for supporting the cooling module 10 in a tilted state will be described in detail.

The cooling module 10 may be provided on a lateral side of the lower end portion thereof with a lower mounting bracket 13, and may be provided on a lateral side of the upper end portion thereof with an upper mounting bracket 11. The lower mounting bracket 13 may limit the angle at which the cooling module 10 is tilted. Consequently, it is possible to restrict rotation of the cooling module 10 and to stably mount the cooling module 10 to the front end module frame. Here, to stably mount the cooling module 10, there is a need to hold the upper end portion of the cooling module 10 with regard to the center of gravity. The upper mounting bracket 11 may be connected to the upper portion of the cooling module 10 with regard to the center of gravity using bolts to support most of the load of the cooling module 10. Although the lower mounting bracket 13 may be additionally mounted on the cooling module 10 to realize a vertical angle of the cooling module 10 as in a conventional case, the lower mounting bracket 13 may be designed to be integrally formed with the cooling module 10 depending on design.

The lower mounting bracket 13 may be shaped to project outwards from a lateral side of the lower end portion of the cooling module 10. The present projecting shape is directed to prevent the front end module frame from being pushed rearwards and thus causing breakage of the cooling module 10 in the event of collision at the front side of the vehicle. The portion at which the lower mounting bracket 13 is connected to the front end module frame may be provided in the space between the lower mounting bracket 13 and the front end module frame. Similar to the lower mounting bracket 13, the upper mounting bracket 11 may be shaped to project upwards from a lateral side of the upper end portion of the cooling module 10. By the present shape, it is possible to prevent the front end module frame from being pushed rearwards and thus causing breakage of the cooling module 10 in the event of collision at the front side of the vehicle.

Figure 3:
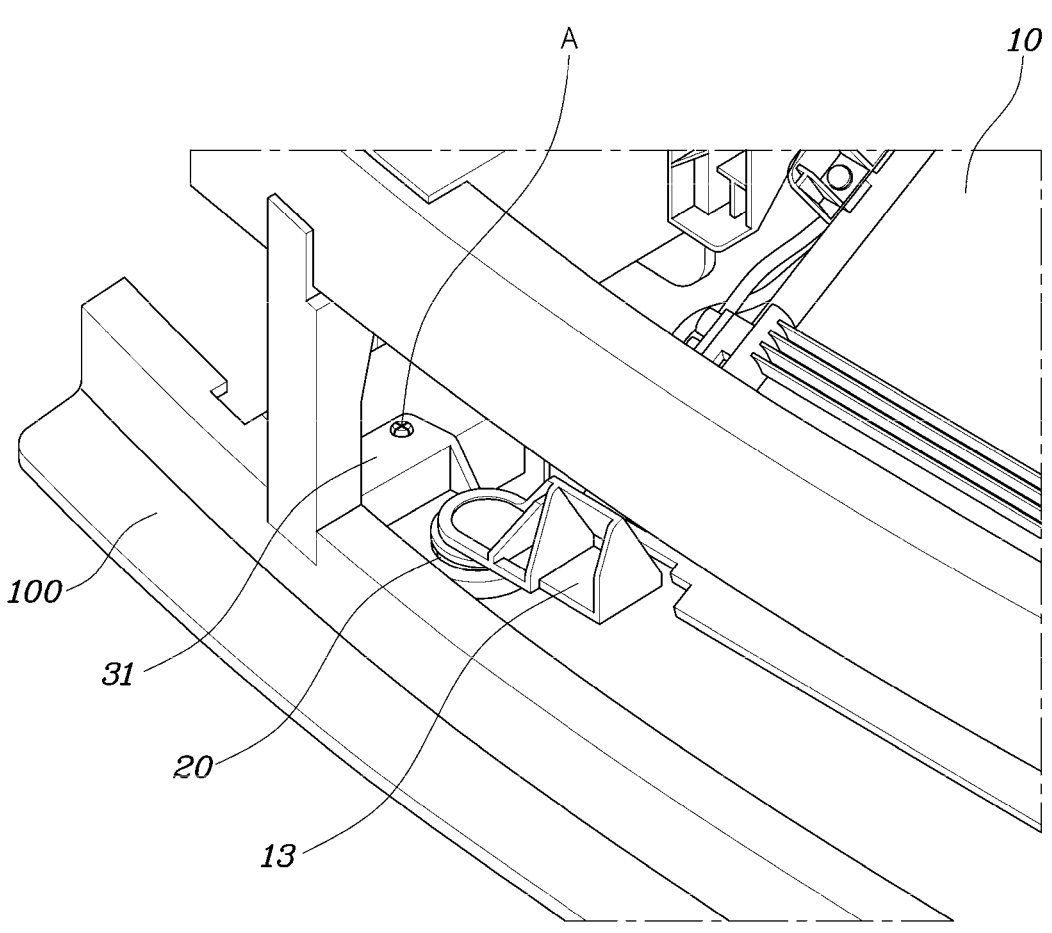
FIG. 3 is a view exemplarily illustrating the connection between a lower mounting bracket and a first bracket according to various exemplary embodiments of the present disclosure.

FIG. 3 is a view exemplarily illustrating the connection between the lower mounting bracket 13 and a first bracket 31 according to various exemplary embodiments of the present disclosure.

Referring to FIG. 3, the first bracket 31 may extend in the rearward direction of the vehicle from the lateral side of the lower crash box 110, 111. The first bracket 31 may be connected to each of opposite sides of the lower end portion of the cooling module 10 in the state in which the cooling module 10 is diagonally tilted. Although the first bracket 31 is connected to an upper portion of the lower crash box 110, 111 using bolts A, as shown in FIG. 3, the first bracket 31 may be designed to be integrally formed with the lower crash box 110, 111. By the connection between the first bracket 31 and the lower mounting bracket 13, it is possible to restrict rotation of the cooling module 10 and to stably mount the cooling module 10 to the front end module frame. Here, the first bracket 31 may be fastened to the lower mounting bracket 13 in the height direction (the vertical direction) of the vehicle. The present vertical connection structure between the first bracket 31 and the lower mounting bracket 13 may be considered to be the optimal structure for restriction of rotation and robust support of the cooling module 10 in the state in which the cooling module 10 is tilted.

Figure 4:
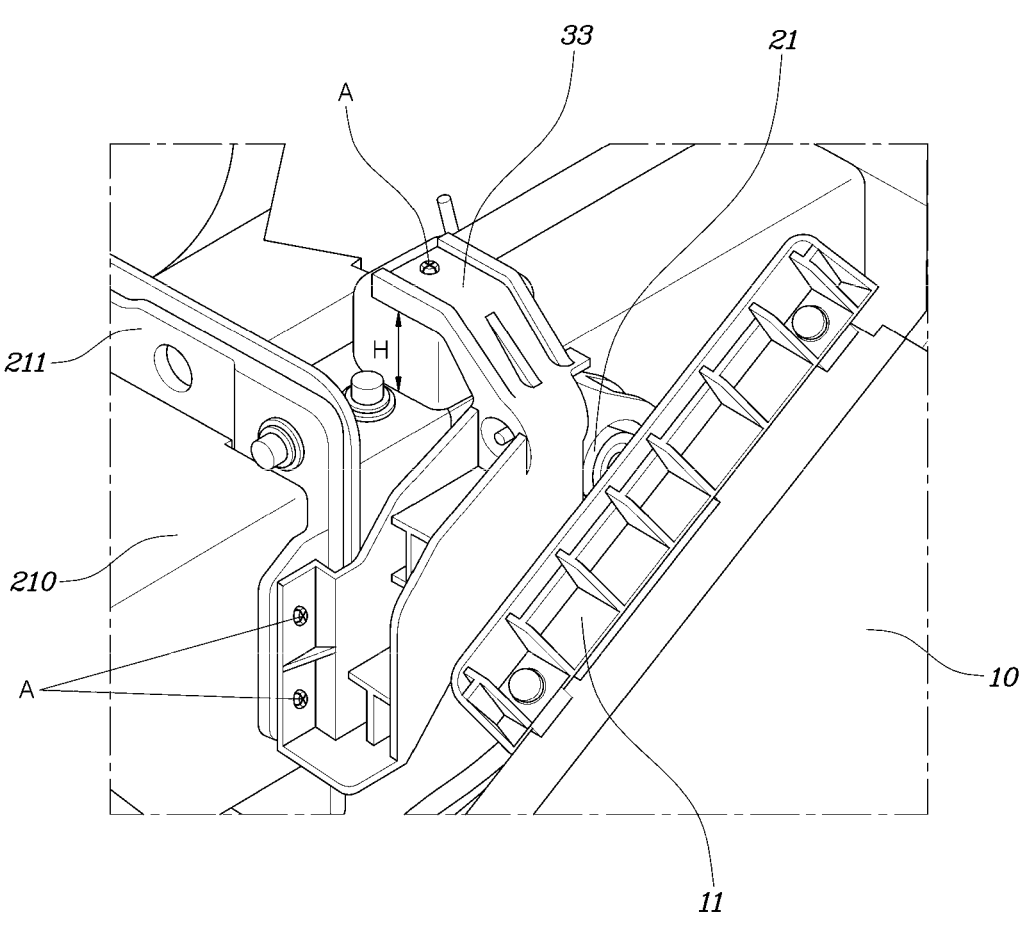
FIG. 4 is a view exemplarily illustrating the connection between an upper mounting bracket and a second bracket according to various exemplary embodiments of the present disclosure.

FIG. 4 is a view exemplarily illustrating the connection between the upper mounting bracket 11 and a second bracket 33 according to various exemplary embodiments of the present disclosure.

Referring to FIG. 4, the second bracket 33 may extend in the inward direction of the vehicle from each of the lateral sides of the front crash box 210, 211. The second bracket 33 may be connected to each of opposite sides of the upper end portion of the cooling module 10 in the state in which the cooling module 10 is diagonally tilted. Although the second bracket 33 is connected to each of the lateral sides of the front crash box 210, 211 using bolts, as shown in FIG. 4, the second bracket 33 may be designed to be integrally formed with the front crash box 210, 211. When the second bracket 33 is connected to the upper mounting bracket 11, the second bracket 33 may be fastened to the lateral side of the front crash box 210, 211 and the front end portion of the front side member 420 using bolts. By the connection between the second bracket 33 and the upper mounting bracket 11, it is possible to stably mount the cooling module 10 to the front end module frame. Here, the second bracket 33 may be connected to the upper mounting bracket 11 in the width direction (the crosswise direction) of the vehicle. The present crosswise connection structure between the second bracket 33 and the upper mounting bracket 11 may be considered to be the optimal structure for restriction of rotation and robust support of the cooling module 10 in the state in which the cooling module 10 is tilted.

On the assembly line of the front end module in which the cooling module 10 is mounted in the tilted state, the second bracket 33 may be connected to each of opposite lateral sides of the cooling module 10 using a single bolt or two bolts to stably mount the cooling module 10. by the present assembly structure, it is possible to stably connect the tilted cooling module 10 to the vehicle body.

The upper mounting bracket 11 may be disposed behind the lower mounting bracket 13 in the rearward direction of the vehicle in the state in which the cooling module 10 is tilted. As a result, it is possible to increase the frunk space. Furthermore, because the surface area in which air comes into contact with the cooling module 10 during traveling of the vehicle is increased and thus flowability of air is improved, effects of cooling an engine and a battery are improved.

An insulator may be provided at one lateral side of the cooling module 10 to block transmission of vibration to the frame when external impact is applied to the vehicle. The insulator may be disposed at each of points at which the lower crash box 110, 111 and the front crash box 210, 211 are connected to the lateral side of the cooling module 10.

The insulator may include a lower insulator 20 and an upper insulator 21. Both the lower insulator 20 and the upper insulator 21 may be made of rubber to improve durability of the first bracket 31, the second bracket 33, the lower mounting bracket 13, and the upper mounting bracket 11 against external impact applied to the vehicle. The lower insulator 20 may be attached to the lower mounting bracket 13, and may then be inserted into the first bracket 31 from the top portion down and may be fastened thereto using bolts.

In an exemplary embodiment of the present disclosure, as shown in FIGS. 1 and 3, the first bracket 31 may include a groove 320 onto which the lower insulator 20 is attached.

The lower insulator 20, which is made of a rubber material, may be inserted into a circular hole formed in the first bracket 31 and may be assembled therewith, supporting the lower portion of the cooling module 10. The upper insulator 21 may be attached to the upper mounting bracket 11, and may then be inserted into the front surface of the second bracket 33 and may be assembled therewith using bolts. The upper insulator 21 may be positioned above the center of gravity of the cooling module 10 for robust support of the cooling module 10.

The front end module frame may further include an upper member 300. The upper member 300 may be disposed at an upper portion of the front portion of the vehicle to extend in the width direction of the vehicle, and may be connected to the front bumper beam 200 in the height direction of the vehicle.

The upper member 300 may be bent at opposite end portions thereof toward the vehicle, and may be connected to a fender apron member 430 of the vehicle. The opposite end portions of the upper member 300 and the fender apron member 430 may be bent toward the front portion of the front side member 420 and may be connected to each other, reducing impact energy transmitted to passengers in the vehicle in the event of collision at the front side of the vehicle.

An upper crash box 310, 311 may be connected to the front end portion of the fender apron member 430, and the upper member 300 may be connected to the front end portion of the upper crash box 310, 311. The upper crash box 310, 311 may include an upper impact-absorbing portion 310 including the form of a column and an upper flange portion 311 formed at the rear end portion of the upper impact-absorbing portion 310. The upper flange portion 311 may be enlarged in the width direction of the vehicle to be easily connected to the front end portion of the fender apron member 430 using bolts.

In the front end module frame of a vehicle, which has been described heretofore, a conventional assembly method on a front end module assembly line may be applied without change. The assembly of the front end module frame is conducted so that the cooling module 10, the front bumper beam 200, the lower member 100, a hood latch and the like are assembled with a front end module carrier in advance, and are finally assembled on the assembly line. Therefore, because the assembly method used on the assembly line is applied without change, it is possible to obtain the associated components, which are assembled into a single assembly in advance, from a vendor. Consequently, the assembly process on a finished vehicle line of a factory is minimized, reducing labor.

Figure 5:
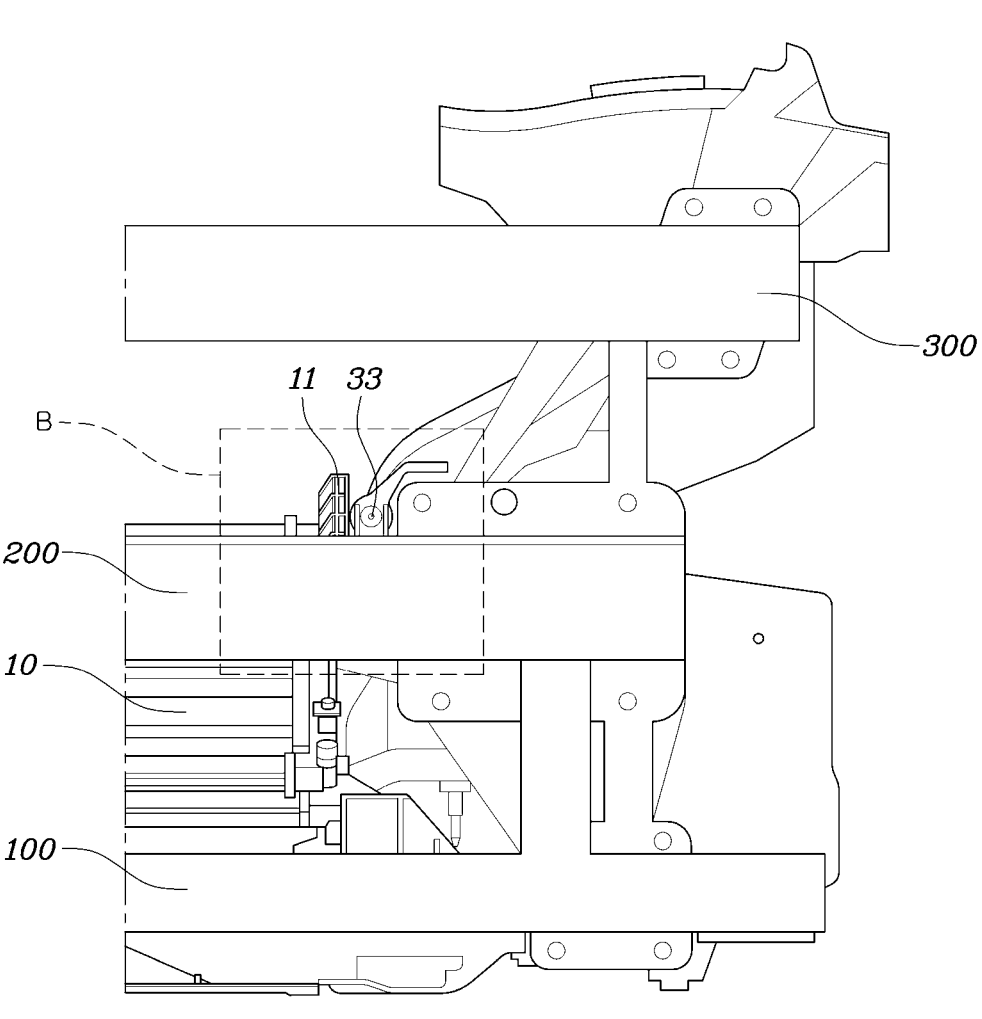
FIG. 5 is a view exemplarily illustrating the second bracket according to various exemplary embodiments of the present disclosure, which projects inside the vehicle.

FIG. 5 is a view exemplarily illustrating the second bracket 33 according to various exemplary embodiments of the present disclosure, which projects inside the vehicle.

Referring to FIG. 5, it is found that the second bracket 33 projects toward the inside of the vehicle. The reason for this is to preliminarily obviate the concern of interference occurring while the upper mounting bracket 11 provided at the cooling module 10 is assembled with the front crash box 210, 211 of the front portion of the vehicle. By the present structure, the second bracket 33 may be connected to the upper mounting bracket 11 without interference when the cooling module 10 is assembled with the front end module frame.

As is apparent from the above description, because the front end module frame of a vehicle according to the exemplary embodiment of the present disclosure is constructed to robustly support the cooling module in the tilted state, it is possible to increase the frunk space. Furthermore, because the surface area in which air comes into contact with the cooling module during traveling of the vehicle is increased and thus flowability of air is improved, effects of cooling an engine and a battery are improved.

The effects, which may be obtained by the present disclosure, are not limited to the above-mentioned effects, and other effects of the present disclosure, which are not mentioned above, will be clearly understood by one of ordinary skill in the art to which the present disclosure belongs, from the descriptions of exemplary embodiments of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A front end module frame of a vehicle, the front end module frame comprising:
  a front bumper beam which extends in a width direction of the vehicle and is connected to a lower member in a vertical direction of the vehicle, the front bumper beam including front crash boxes provided at opposite end portions of the front bumper beam, and the front crash boxes being connected to a front end portion of a front side member,
  wherein the front crash boxes provided at the opposite end portions of the front bumper beam are respectively connected to a cooling module via opposite lateral sides of the cooling module in forward and backward directions of the vehicle in a state in which the cooling module is diagonally tilted with respect to a longitudinal direction of the vehicle.

2. The front end module frame of claim 1,
  wherein the lower member is disposed on a front and lower portion of the vehicle to extend in the width direction of the vehicle and is provided at opposite end portions thereof with lower crash boxes, the lower crash boxes being connected to a front end portion of a front sub-frame, and
  wherein the lower crash boxes provided at the opposite end portions of the lower member are respectively connected to the opposite lateral sides of the cooling module in the state in which the cooling module is diagonally tilted with respect to the longitudinal direction of the vehicle.

3. The front end module frame of claim 1,
  wherein the cooling module includes lower mounting brackets and upper mounting brackets, and
  wherein the cooling module is provided at lateral sides of a lower end portion thereof with the lower mounting brackets and is provided at lateral sides of an upper end portion thereof with the upper mounting brackets.

4. The front end module frame of claim 3, wherein the lower mounting brackets are formed to project outwards from the lateral sides of the lower end portion of the cooling module, and the upper mounting brackets are formed to project upwards from the lateral sides of the upper end portion of the cooling module.

5. The front end module frame of claim 3,
  wherein the lower member is disposed on a front and lower portion of the vehicle to extend in the width direction of the vehicle and is provided at opposite end portions thereof with lower crash boxes, the lower crash boxes being connected to a front end portion of a front sub-frame, and
  wherein each of the lower crash boxes is provided at a lateral side thereof with a first bracket which extends in a rearward direction of the vehicle, the first bracket being connected to a corresponding one of the lower mounting brackets in the state in which the cooling module is diagonally tilted with respect to the longitudinal direction of the vehicle.

6. The front end module frame of claim 5, wherein the first bracket is fastened to the lower mounting bracket in the vertical direction of the vehicle.

7. The front end module frame of claim 6, wherein the first bracket includes a groove onto which an end portion of the corresponding lower mounting bracket is mounted.

8. The front end module frame of claim 7, further including an insulator mounted between the groove of the first bracket and the end portion of the corresponding lower mounting bracket.

9. The front end module frame of claim 7,
wherein the first bracket is connected to an upper portion of the corresponding lower crash box.

10. The front end module frame of claim 3, wherein each of the front crash boxes is provided at a lateral side thereof with a second bracket which extends in an inward direction of the vehicle, the second bracket being connected to a corresponding one of the upper mounting brackets in the state in which the cooling module is diagonally tilted with respect to the longitudinal direction of the vehicle.

11. The front end module frame of claim 10, wherein the second bracket is fastened to a lateral side of a corresponding one of the front crash boxes and a front end portion of a front side member.

12. The front end module frame of claim 10, wherein the second bracket is connected to a corresponding one of the upper mounting brackets in the width direction of the vehicle.

13. The front end module frame of claim 3, wherein the upper mounting brackets are disposed behind the lower mounting brackets in a rearward direction of the vehicle in the state in which the cooling module is diagonally tilted with respect to the longitudinal direction of the vehicle.

14. The front end module frame of claim 2, wherein the cooling module is provided at lateral sides thereof with insulators configured to block transmission of vibration to the front end module frame when external impact is applied to the vehicle, the insulators being respectively disposed at points at which the lower crash boxes and the front crash boxes are connected to the lateral sides of the cooling module.

15. The front end module frame of claim 2, wherein the lower crash boxes are connected to a front end portion of the front sub-frame, and front end portions of the lower crash boxes are connected to the lower member.

16. The front end module frame of claim 15, wherein each of the lower crash boxes includes a lower impact-absorbing portion including a form of a column and a lower flange portion formed at a rear end portion of the lower impact-absorbing portion, the lower flange portion being connected to the front end portion of the front sub-frame.

17. The front end module frame of claim 1, wherein the front bumper beam is connected at a point which faces the front end portion of the front side member so that the front bumper beam and the front side member together form a front load pass.

18. The front end module frame of claim 1, further including an upper member which is disposed on a front and upper portion of the vehicle to extend in the width direction of the vehicle and is connected to the front bumper beam in a height direction of the vehicle, the upper member being bent at opposite end portions thereof toward the vehicle and being connected to a fender apron member of the vehicle.

19. The front end module frame of claim 18, wherein the fender apron member is provided at a front end portion thereof with an upper crash box, and the upper member is connected to a front end portion of the upper crash box.

\* \* \* \* \*